(12) United States Patent
Uhl et al.

(10) Patent No.: US 7,219,648 B2
(45) Date of Patent: May 22, 2007

(54) WORKING TOOL

(75) Inventors: Klaus-Martin Uhl, Plochingen (DE); Sebastian Friedrich, Waiblingen (DE); Jens Riehmann, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/164,674

(22) Filed: Dec. 1, 2005

(65) Prior Publication Data

US 2007/0000134 A1 Jan. 4, 2007

(30) Foreign Application Priority Data

Dec. 2, 2004 (DE) .................... 10 2004 058 136

(51) Int. Cl.
*F02B 77/04* (2006.01)
*F02M 35/02* (2006.01)

(52) U.S. Cl. ................................. 123/198 E
(58) Field of Classification Search ........... 123/198 E, 123/195 AC, 184.47
See application file for complete search history.

(56) References Cited

U.S. PATENT DOCUMENTS 5,485,817 A * 1/1996 Dahlberg ................ 123/198 E
5,632,243 A * 5/1997 Buchholz ................ 123/198 E
5,676,115 A * 10/1997 Linsbauer et al. .......... 123/516
5,813,384 A * 9/1998 Lavender et al. ....... 123/198 E
6,612,275 B2 * 9/2003 Immel et al. ............. 123/90.31
6,681,726 B2 * 1/2004 Linsbauer et al. ....... 123/41.65
6,880,516 B2 * 4/2005 Maier et al. ............ 123/198 E
6,955,152 B2 * 10/2005 Uhl et al. ............... 123/198 E
6,991,664 B2 * 1/2006 Riehmann et al. ............ 55/321
2004/0094114 A1 5/2004 Riehmann et al. .......... 123/198
2004/0261754 A1 * 12/2004 Uhl et al. ............... 123/198 E

* cited by examiner

*Primary Examiner*—Hai Huynh
(74) *Attorney, Agent, or Firm*—Gudrun E. Huckett (57) ABSTRACT

A hand-guided working tool has an internal combustion engine having a crankshaft and a fan wheel driven by the crankshaft. An air cleaning device is provided for cleaning the combustion air for the internal combustion engine. The air cleaning device has a dirt chamber and a vacuum channel extending away from the dirt chamber and opening in the area of the fan wheel. A section of the vacuum channel is formed by a vacuum hose. The vacuum hose is arranged in a mounting area of a fastening element and comprises a mounting channel through which the fastening element is accessible.

19 Claims, 6 Drawing Sheets

WORKING TOOL

BACKGROUND OF THE INVENTION

The invention relates to a hand-guided working tool, in particular, a cut-off machine or the like, that comprises an internal combustion engine that has a crankshaft that drives a fan wheel. The working tool further comprises a device for cleaning the combustion air for the internal combustion engine. The device comprises a dirt chamber. A vacuum channel extends away from the dirt chamber and opens in the area of the fan wheel. A section of the vacuum channel is formed in a vacuum hose.

U.S. 2004/0094114 A1 discloses a cut-off machine provided with several cyclone pipes for cleaning the combustion air. The cyclone pipes separate particles from the combustion air which particles are sucked away by a vacuum hose that opens at a fan wheel.

The mounting space available in hand-guided working tools, in particular, cut-off machines, is minimal. The vacuum hose opens between fan wheel and crankcase. This area must be accessible also for screwing the cylinder onto the crankcase.

The invention has the object to provide a hand-guided working tool of the aforementioned kind that has a compact size.

SUMMARY OF THE INVENTION

In accordance with the present invention, the object is solved by a hand-guided working tool whose vacuum hose is arranged in the mounting area of a fastening element and comprises a mounting channel through which the fastening element is accessible.

The mounting channel enables the arrangement of the vacuum hose in an area that is required for mounting. The mounting channel enables excellent accessibility and unhindered mounting of the fastening element. In this way, a mounting space that otherwise is to be kept free only for mounting purposes can be utilized well and the working tool is provided with a compact configuration.

In order to ensure a simple accessibility of the fastening element, it is provided that the mounting channel extends in extension of the mounting direction of the fastening element. In this connection, the mounting direction is the direction in which the required tool for mounting or demounting the fastening element is to be arranged.

It is provided that the vacuum hose has an intake opening and an outlet opening for the vacuum channel and two mounting openings for the mounting channel. In this way, intake opening and outlet opening as well as the mounting openings can be arranged independent of one another on the vacuum hose. In this way, a favorable course of the vacuum channel can be achieved and the available mounting space can be utilized very well. In this connection, intake opening and outlet opening are arranged in particular on longitudinal sides of the vacuum hose. It is provided that a section of the mounting channel forms a section of the vacuum channel.

Advantageously, the vacuum hose is secured on a housing section of the working tool and on the combustion engine. The vacuum hose must extend in this area and the accessibility for screwing the cylinder onto the crankcase must be ensured in this area. In order to be able to compensate relative movements between the combustion engine and the housing section that are caused by vibrations of the motor, it is provided that the vacuum hose has at least one expansion fold between the housing section and the internal combustion engine. It is provided that the first end of the vacuum hose is secured in an opening in the housing section and the first end is provided with the mounting opening. The vacuum hose can be secured and positioned very well in the opening. Expediently, the second end of the vacuum hose is secured in a bore of the internal combustion engine wherein the second mounting opening is formed at the second end. Advantageously, the longitudinal axis of the bore in the combustion engine is positioned at an angle to the longitudinal axis of the opening in the housing section which angle is greater than 0°. Because of the angular arrangement of the bore and of the opening, the position of the vacuum hose is defined. When the vacuum hose is arranged in the opening and the bore, the intake opening and the outlet opening are aligned accordingly relative to the adjoining sections of the vacuum channel. In this way, a simple and safe mounting of the vacuum hose is realized.

In order to avoid leaks in the vacuum channel as a result of the mounting openings, it is provided that the working tool has a grip pipe and on the clamping shell of the grip pipe a plug is secured that closes off the first mounting opening. Without grip pipe, the working tool can be operated only with difficulty so that it is easily apparent to the operator that the grip pipe is missing. When the grip pipe is mounted the mounting opening is securely closed by the plug. In this way, it is ensured that the mounting opening is closed in operation of the working tool and the vacuum channel is seal-tight. No additional parts for closing the first mounting opening are required. Minimal mounting space for the vacuum channel is required when a section of the vacuum channel is formed in the housing section.

Advantageously, the section of the vacuum channel formed in the housing section connects the dirt chamber of the air cleaning device with the intake opening that opens into the vacuum hose. The fastening element is in particular a cylinder base screw of the internal combustion engine.

It is provided that the fan wheel on its rear side that is facing the crankcase supports a rear vane arrangement and that the vacuum hose opens in the area of the rear vane arrangement at the fan wheel. Excellent cleaning of the sucked-in combustion air can be achieved when the air cleaning device comprises a pre-separator and a fine separator. The pre-separator has advantageously at least one cyclone pipe and the fine separator is expediently an air filter. The vacuum channel extends in particular away from the dirt chamber of the pre-separator.

It is expedient to insert a sleeve into the vacuum hose. The sleeve is arranged in particular in an area of the vacuum hose in which the vacuum hose is secured in a housing section of the working tool. In this connection, the sleeve is designed such that is presses the outer circumference of the vacuum hose against the housing section so that in this way an improved sealing action between the vacuum hose and the housing section is effected.

BRIEF DESCRIPTION OF THE DRAWINGS

Embodiments of the invention will be explained in the following with the aid of the drawing.

DESCRIPTION OF PREFERRED EMBODIMENTS

Figure 1:
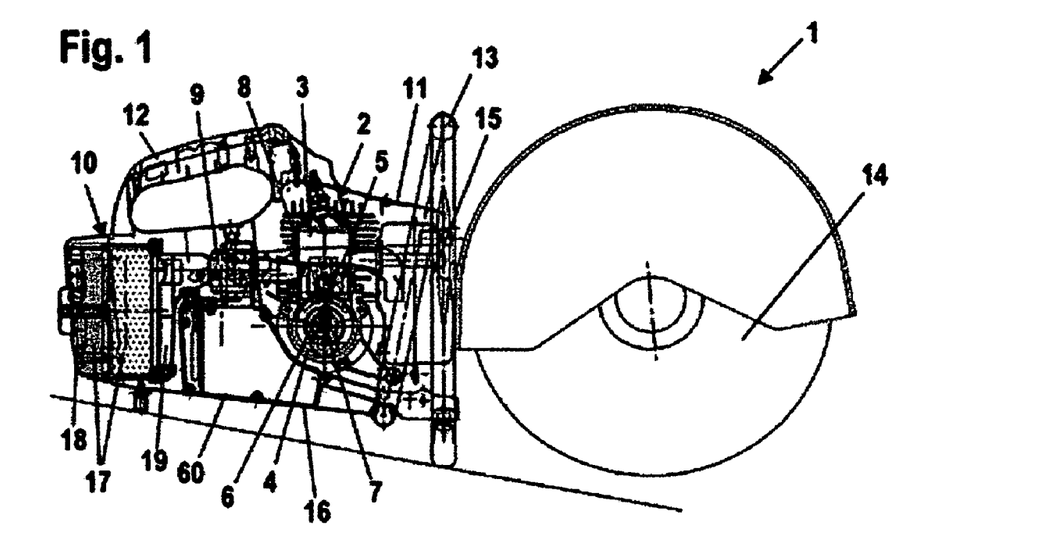
FIG. 1 shows a schematic longitudinal section of a working tool.

The working tool 1 illustrated schematically in longitudinal section in FIG. 1 is a cut-off machine having a housing 11 on which a handle 12 is arranged. The handle 12 is secured on the housing 11 of the working tool 1. The cut-off machine has a grip pipe 13 that extends transversely to the handle 12 and spans the housing 11. The working tool 1 has a tank housing 16 extending across the bottom 60 of the working tool 1. The working tool 1 has a tool, in this embodiment a cut-off wheel 14, that is driven by an internal combustion engine 2, in this case a two-stroke engine, arranged in the housing 11. The internal combustion engine 2 has a cylinder 8 in which a combustion chamber 3 is provided. The combustion chamber 3 is delimited by a piston 5 that drives by means of a connecting rod 6 a crankshaft 7 supported rotatably in the crankcase 4. A fan wheel, not illustrated in FIG. 1, for conveying cooling air to the internal combustion engine 2 is arranged on the crankshaft 7. The crankcase 4 is screwed onto the cylinder 8.

In operation, air and fuel are supplied to the internal combustion engine 2. The sucked-in combustion air is cleaned by an air cleaning device. It comprises an air filter 10 illustrated in FIG. 1. Filter material 17 is arranged in the air filter 10 and separates the dirt chamber 18 from a clean chamber 19. The filter material 17 comprises a coarse filter and a fine filter. A carburetor 9 is arranged at the clean chamber 19; in the carburetor, fuel is supplied to the combustion air and the fuel/air mixture is prepared. At the outlet of the combustion chamber 3 an exhaust gas muffler 15 is arranged into which the exhaust gases originating in the internal combustion engine 2 flow.

Figure 2:
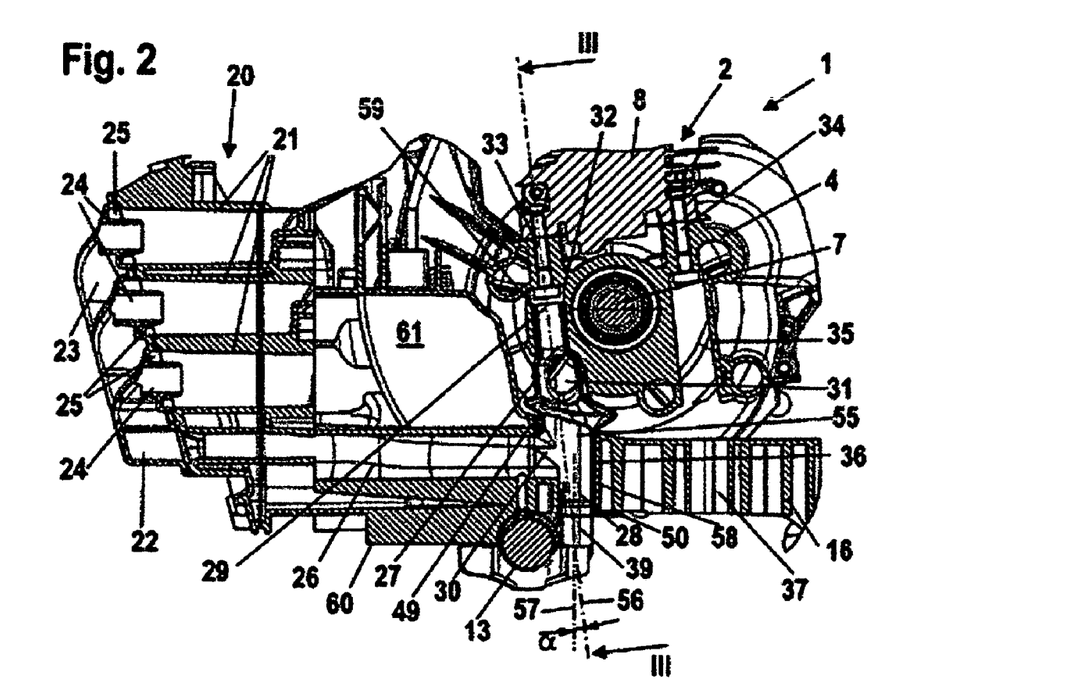
FIG. 2 is a detail section view of a working tool.

As shown in section in FIG. 2, the air cleaning device of the working tool 1 comprises a pre-separator 20 that is arranged upstream of the air filter 10. The pre-separator 20 has three cyclone pipes 21. A discharge pipe 24 projects into each one of the cyclone pipes 21, respectively. The discharge pipes 24 are formed in a common lid 23 and open into the dirt chamber 18 of the air filter 10 illustrated in FIG. 1. The discharge pipes 24 project into the cyclone pipes 21. Between the discharge pipes 24 and the cyclone pipes 21 an annular chamber 25 is formed in which the particles removed by the cyclone pipes 21 are collected. The annular chambers 25 are connected by channels formed in the lid 23 to the dirt chamber 22 into which the particles are discharged. The dirt chamber 22 is formed in the lid 23 in an area that adjoins the tank housing 16. The fuel tank 61 is formed in the tank housing 16.

The internal combustion engine 2 is arranged adjacent to the fuel tank 61 above the tank housing 16, i.e., it is arranged on the side of the tank housing 16 facing away from the bottom 60 of the working tool 1, in the interior of the housing 11. The grip pipe 13 is secured to the bottom 60 of the working tool 1.

For removing the particles from the dirt chamber 22, the working tool 1 has a vacuum channel 26 that connects the dirt chamber 22 to the fan wheel 38 (FIG. 3) arranged adjacent to the crankcase 4 on the crankshaft 7. The vacuum channel 26 opens at the fan wheel 38 into an under pressure area, in particular located adjacent to the crankshaft 7. A section of the vacuum channel 26 is formed within the tank housing 16. The section of the vacuum channel 26 formed in the tank housing 16 extends from the dirt chamber 22 to an opening 36 in the tank housing 16. The crankcase 4 is screwed by means of cylinder base screws 33 and 34 onto the cylinder 8. The cylinder base screws 33 and 34 are mounted from a side of the internal combustion engine 2 facing the crankcase 4 and facing away from the cylinder 8. The opening 36 is positioned in extension of the longitudinal axis 56 of the cylinder base screw 33. Through the opening 36, the cylinder base screw 33 can be tightened or loosened. An opening 37 is provided in the tank housing 16 in extension of the cylinder base screw 34. The openings 36 and 37 are formed as through bores. The crankcase 4 is provided at the location of the cylinder screw 33 with a bore 32 and at the location of the cylinder screw 34 with a bore 35; the bores extend from the cylinder screws 33 and 34 in the direction toward the openings 36 and 37 in the tank housing 16. Through the bores, the cylinder screws 33 and 34 can be mounted.

Between the tank housing 16 and the crankcase 4 of the internal combustion engine 2, a vacuum hose 27 is arranged; a section of the vacuum channel 26 is formed therein. The vacuum hose 27 has an intake opening 30 that is arranged on the tank housing 16 and adjoins the section of the vacuum channel 26 formed in the tank housing 16. The vacuum hose 27 has an outlet opening 31 in the area of the crankcase 4. The section of the vacuum channel 26 positioned between the intake opening 30 and the outlet opening 31 forms at the same time a section of a mounting channel 55 through which the cylinder base screw 33 can be tightened or loosened. The mounting channel 55 extends approximately in the direction of the longitudinal axis 56 of the cylinder base screw 33. The vacuum hose 27 has a first mounting opening 28 formed at a first end 58 of the vacuum hose 27. The first end 58 of the vacuum hose 27 is secured in the tank housing 16 and projects through the opening 36 in the tank housing 16. The vacuum hose 27 has a collar 50 resting against the bottom 16 of the tank housing 16. On the opposite side of the tank housing 16 the vacuum hose 27 has an expansion fold 40. By means of the expansion fold 40 and the collar 50, the vacuum hose 27 is secured in the tank housing 16. It is also possible to provide several such expansion folds. On the opposed second end 59 of the vacuum hose 27, a second mounting opening 29 is formed. The second end 59 of the vacuum hose 27 is seal-tightly arranged in the bore 32 in the crankcase 4. The longitudinal axis 56 of the cylinder screw 33 coincides with the longitudinal center axis of the second end 59 of the vacuum hose 27. The longitudinal axis 57 of the opening 36 in the tank housing 16 is slanted relative to the longitudinal axis 56 about an angle α that is >0°; for example, it is 2° to 20°.

At the end of the grip pipe 13 secured to the bottom 60 of the tank housing 16, a plug 39 is secured by means of a web 53 to the clamping shell of the grip pipe 13; the plug projects into the first mounting opening 28 and closes it off. When the grip pipe is mounted, it is in this way ensured that the first mounting opening 28 is closed off and that particles are conveyed to the fan wheel.

Figure 3:
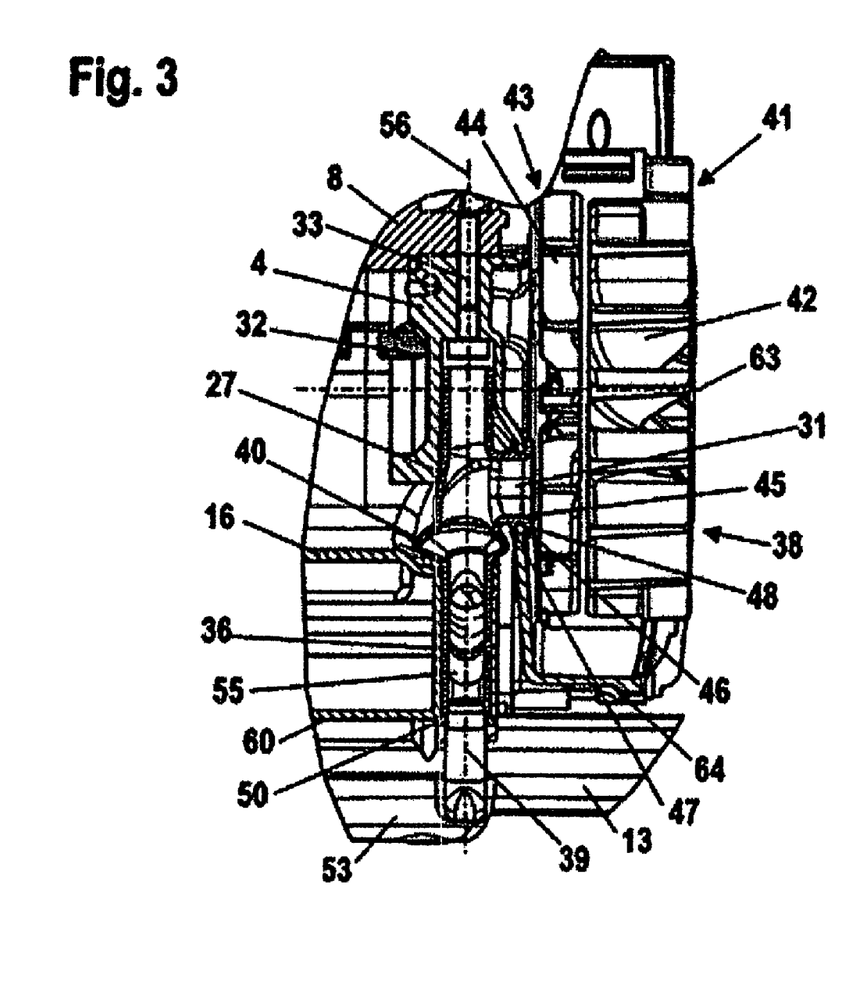
FIG. 3 shows a section along the line III—III of FIG. 2.

In FIG. 3, the arrangement of the vacuum hose 27 on the fan wheel 38 is illustrated. The fan wheel 38 has on the front side 41 facing away from the crankcase 4 a front vane arrangement 42 and on the rear side 43 facing the crankcase 4 a rear vane arrangement 44. The fan wheel 38 is secured on the crankshaft 7 and rotates about the axis 63 that is at the same time the axis of rotation of the crankshaft 7. The mounting channel 55 in the vacuum hose 27 is positioned in a plane that extends perpendicularly to the axis 63. The outlet opening 31 opens at the rear vane arrangement 44 at a minimal spacing to the axis 63. In this area, under pressure is present because of the rotational movement of the fan wheel 38.

The outlet opening 31 is formed on a socket 45 that has an outwardly projecting rim 47 and an outwardly projecting rim 48. The socket 45 projects through opening 46 into a housing part 64. The rims 47 and 48 are positioned on opposed sides of the housing part 64 and in this way secure the vacuum hose 27 in the opening 46.

Figure 4:
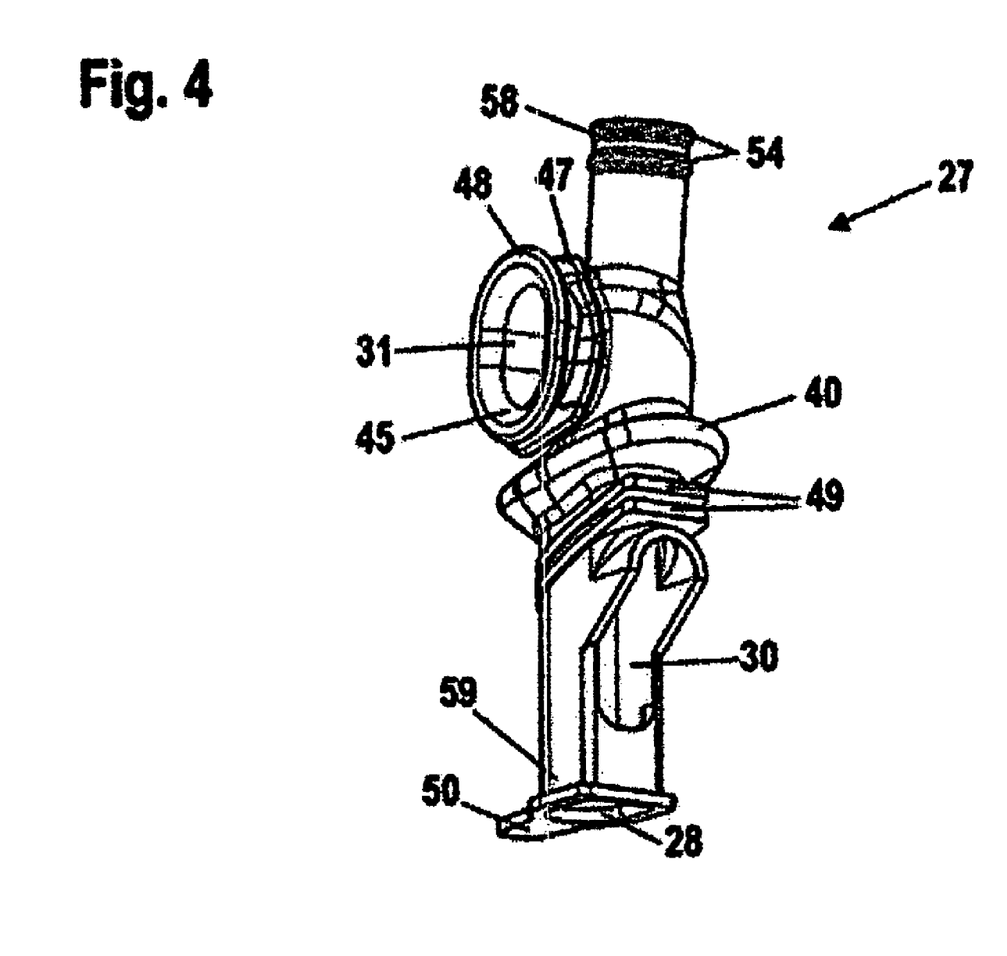
FIG. 4 is a perspective illustration of a vacuum hose.

As shown in the perspective illustration of FIG. 4, on the first end 58 of the vacuum hose 27 two outer beads 54 are formed. They ensure that the first end 58 of the vacuum hose 27 rests sealingly in the bore 32 in the cylinder 4. Between the expansion fold 40 and the intake opening 30 two circumferentially extending ribs 49 are formed on the vacuum hose 27. As shown in FIG. 2, the two ribs 49 contact the wall of the tank housing 16 adjacent to the fuel tank and ensure the correct position of the vacuum hose 27. A step 67 is formed on the intake opening 30. The wall 68 of the step 67 rest against the tank housing 16 and thereby positionally fixes the vacuum hose 27 together with the collar 50.

Figure 5:
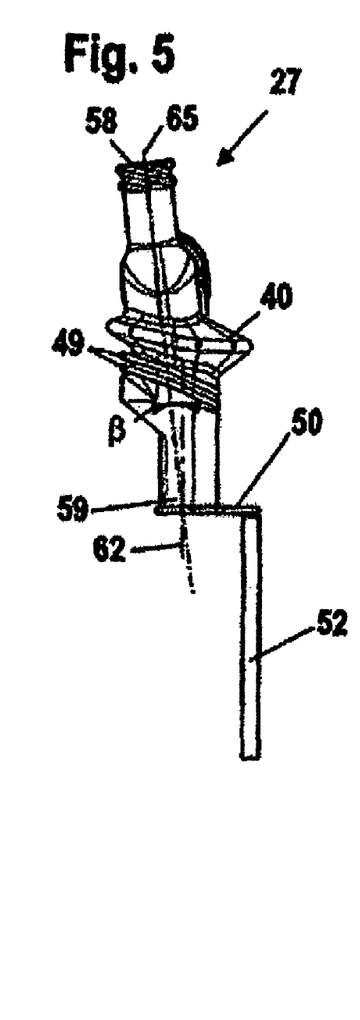
FIG. 5 is a side view of a vacuum hose.
Figure 6:
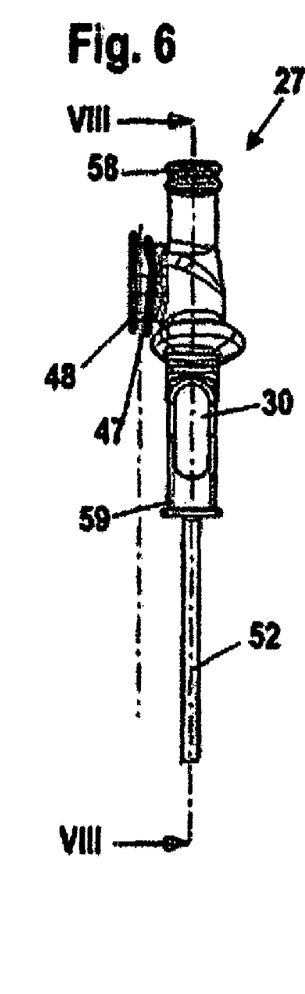
FIG. 6 is a side view in the direction of arrow VI of FIG. 5.
Figure 7:
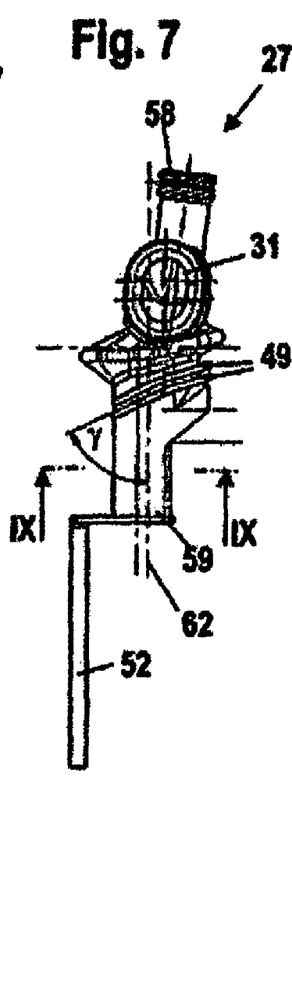
FIG. 7 shows a side view in the direction of arrow VII of FIG. 6.

As shown in FIG. 5, the longitudinal center axis 62 of the second end 59 of the vacuum hose 27 is positioned relative to the longitudinal center axis 65 of the first end 58 at an angle β that matches the angle α between the longitudinal axes 56 and 57 of the openings 36 and the bore 32. As shown in FIG. 7, the ribs 49 are slanted relative to the longitudinal center axis 62 of the second end 59 at an angle γ that is smaller than 90°. This creates a reinforcement of the vacuum hose 27 and prevents buckling between the expansion fold 40 and the ribs 49.

Figure 8:
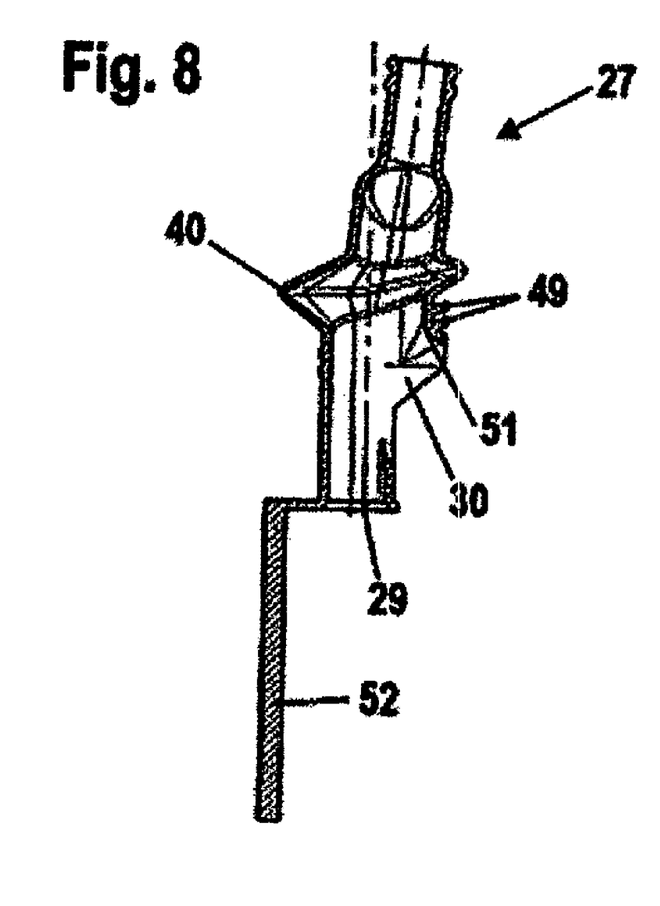
FIG. 8 shows a section along the line VIII—VIII of FIG. 6.

As shown in FIGS. 5 through 8, on the collar 50 at the second end 59 a mounting aid 52 is integrally formed. The mounting aid 52 is advantageously the sprue of the vacuum hose 27 that is produced from plastic material, in particular from EPDM (ethylene-propylene rubber). By means of the mounting aid 52, the vacuum hose 27 can be pulled from the side facing the internal combustion engine 2 through the opening 36 in the tank housing 16. As soon as the vacuum hose 27 has been mounted, the mounting aid 52 will be cut off. As shown in FIG. 8, on the intake opening 30 at the level of the ribs 49 a rounded portion 51 is formed which provides for an excellent flow guiding action in the vacuum hose 27 and a minimal flow resistance.

Figure 9:
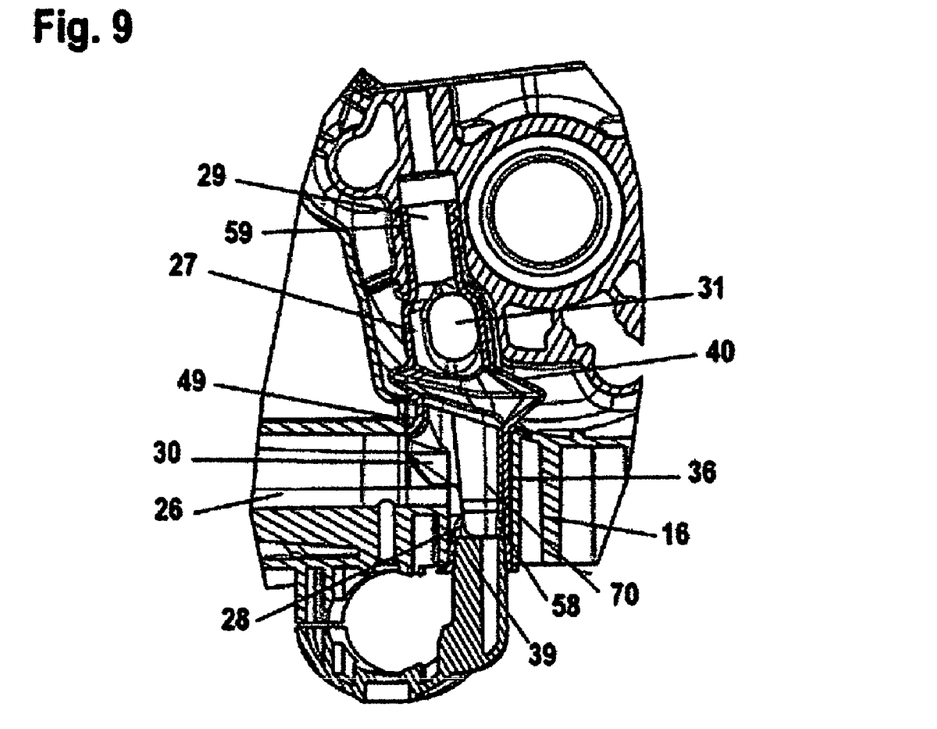
FIG. 9 shows a section view of a vacuum hose within a working tool.

In FIG. 9, another embodiment of a vacuum hose is illustrated. The configuration of the vacuum hose 27 illustrated in FIG. 9 corresponds essentially to that of the vacuum hose 27 of FIGS. 2 to 8. Same elements are identified with same reference numerals in the Figures. In the area of the tank housing 16, a sleeve 70 is inserted into the vacuum hose 27 shown in FIG. 9. The sleeve 70 rests seal-tightly against the inner wall of the vacuum hose 27 and presses the vacuum hose against the inner wall of the opening 36 in the tank housing 16. In this way, an excellent sealing action between the vacuum hose 27 and the tank housing 16 is realized. The sleeve 70 extends from the plug 39 into the area below the expansion fold 40 of the vacuum hose 27. In the area of the rib 49 of the vacuum hose 27, the sleeve 70 also presses the vacuum hose 27 with its rib 49 against the opening 36 of the tank housing 16.

Figure 10:
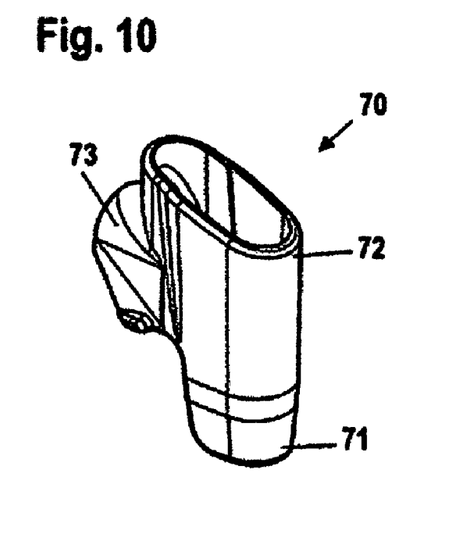
FIG. 10 is a first perspective illustration of the sleeve of the vacuum hose of FIG. 9.
Figure 11:
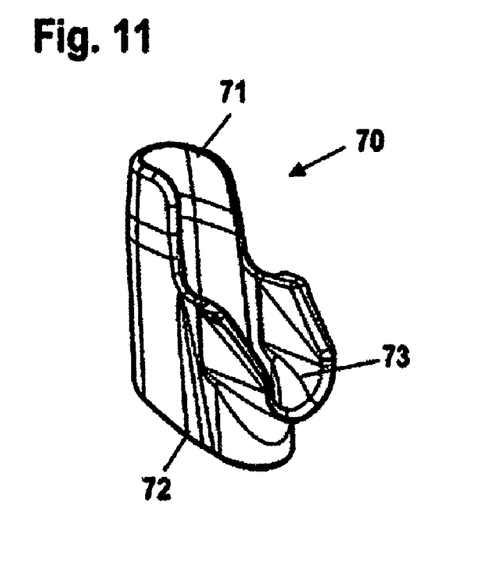
FIG. 11 is a second perspective illustration of the sleeve of the vacuum hose of FIG. 9.

In FIGS. 10 and 11, the sleeve 70 is shown in a perspective view, respectively. The first end 71 of the sleeve 70 is positioned adjacent to the plug 39 in the vacuum hose 27. In the area of the first end 71 the sleeve 70 is open in the direction toward the intake opening 30. In the area of the intake opening 30 the sleeve has a collar 73 whose contour corresponds approximately to the contour of the vacuum hose 27 in the area of the intake opening 30. On the opposed second end 72 the sleeve 70 has an elongate closed cross-section. The sleeve 70 can be made of, for example, plastic material or sheet metal.

The sleeve 70 extends within the vacuum hose 27 in the area of the first mounting opening 28 and the intake opening 30. However, it can also be provided that, additionally or instead, one or several sleeves are provided in the area of the outlet opening 31 and/or in the area of the second mounting opening 29 in order to achieve also in this area an improvement of the sealing action of the vacuum hose 27.

While specific embodiments of the invention have been shown and described in detail to illustrate the inventive principles, it will be understood that the invention may be embodied otherwise without departing from such principles.

What is claimed is:

1. A hand-guided working tool comprising:
   an internal combustion engine having a crankshaft and a fan wheel driven by the crankshaft;
   an air cleaning device cleaning the combustion air for the internal combustion engine;
   the air cleaning device comprising a dirt chamber and a vacuum channel extending away from the dirt chamber and opening in the area of the fan wheel;
   wherein a section of the vacuum channel is formed by a vacuum hose;
   wherein the vacuum hose is arranged in a mounting area of a fastening element and comprises a mounting channel through which the fastening element is accessible.

2. The working tool according to claim 1, wherein the mounting channel extends in extension of the mounting direction of the fastening element.

3. The working tool according to claim 1, wherein the vacuum hose has an intake opening, an outlet opening, and two mounting openings for the mounting channel.

4. The working tool according to claim 3, wherein the intake opening and the outlet opening are arranged on longitudinal sides of the vacuum hose.

5. The working tool according to claim 3, wherein a section of the mounting channel forms a section of the vacuum channel.

6. The working tool according to claim 3, wherein the vacuum hose is secured to a housing section of the working tool and to the internal combustion engine.

7. The working tool according to claim 6, wherein the vacuum hose has at least one expansion fold between the housing section and the internal combustion engine.

8. The working tool according to claim 6, wherein the vacuum hose has a first end and a second end, wherein the first end is secured in an opening of the housing section and wherein the first end is provided with the first mounting opening.

9. The working tool according to claim 8, wherein the second end is secured in a bore of the internal combustion engine and wherein the second end is provided with the second mounting opening.

10. The working tool according to claim 9, wherein a longitudinal axis of the bore of the internal combustion engine is positioned at an angle that is greater than 0° relative to a longitudinal axis of the opening of the housing section.

11. The working tool according to claim 8, wherein the working tool has a grip pipe provided with a clamping shell, wherein the clamping shell of the grip pipe has a plug that closes off the first mounting opening.

12. The working tool according to claim 6, wherein a section of the vacuum channel is formed in the housing section.

13. The working tool according to claim 12, wherein the section of the vacuum channel formed in the housing section connects the dirt chamber with the intake opening of the vacuum hose.

14. The working tool according to claim 1, wherein the fastening element is a cylinder base screw of the internal combustion engine.

15. The working tool according to claim 1, wherein the fan wheel has a rear side facing a crankcase of the internal combustion engine and wherein the rear side has a rear vane arrangement, wherein the vacuum hose opens in the area of the rear vane arrangement at the fan wheel.

16. The working tool according to claim 1, wherein the air cleaning device has a pre-separator and a fine separator.

17. The working tool according to claim 16, wherein the pre-separator has at least one cyclone pipe and the fine separator is an air filter.

18. The working tool according to claim 16, wherein the dirt chamber is a part of the pre-separator and wherein the vacuum channel extends away from the dirt chamber.

19. The working tool according to claim 1, further comprising a sleeve inserted into the vacuum hose.

* * * * *